United States Patent [19]

Decroix

[11] 4,409,286

[45] Oct. 11, 1983

[54] COMPOSITE THERMOPLASTIC FILMS AND A PROCESS FOR THEIR PREPARATION

[75] Inventor: Jean-Claude Decroix, Arras, France

[73] Assignee: Societe Chimique des Charbonnages-CDF Chimie, Paris, France

[21] Appl. No.: 378,903

[22] Filed: May 17, 1982

[30] Foreign Application Priority Data

May 15, 1981 [FR] France .................. 81 09684

[51] Int. Cl.³ .................. B32B 27/10; B32B 27/08; B28B 3/20
[52] U.S. Cl. .................. 428/332; 264/176 R; 428/215; 428/476.3; 428/515; 428/516; 428/518; 428/521; 428/913
[58] Field of Search .................. 428/476.3, 215, 332, 428/575, 516, 518, 521, 347, 349, 913; 264/176 R

[56] References Cited

U.S. PATENT DOCUMENTS 4,302,511  11/1981  Tuller et al. .................. 428/476.3

FOREIGN PATENT DOCUMENTS 1323379  2/1963  France .................. 428/515

*Primary Examiner*—Thomas J. Herbert, Jr.
*Attorney, Agent, or Firm*—Finnegan, Henderson, Farabow, Garrett & Dunner

[57] ABSTRACT

A composite film for packaging foods having at least one layer of a thermoplastic film of low density polyethylene, polypropylene, polybutene, polyamide, polystyrene or polyvinyl chloride having a thickness between 25 and 3,000 μm, and another layer of a terpolymer film having a thickness between 10 and 100 μm.

The terpolymer film contains from 88 to 98.7 mol % of units derived from ethylene, from 1 to 10 mol % of units derived from an ester of an alkyl acrylate or an alkyl methacrylate, the alkyl group having from 1 to 6 carbon atoms, and from 0.3 to 3 mol % of units derived from maleic anhydride.

8 Claims, No Drawings

COMPOSITE THERMOPLASTIC FILMS AND A PROCESS FOR THEIR PREPARATION

BACKGROUND OF THE INVENTION

The present invention relates to composite thermoplastic films and, more particularly, to new and improved composite films of a thermoplastic film and an ethylene terpolymer film and to a process for their preparation.

It is known in the packaging industry to produce composite packaging film to combine the complementary advantageous properties or characteristics of plastics of different families since no single plastic has all the characteristics demanded by the users of the film. Among the properties which one frequently wishes to combine in such films are, in particular, water impermeability and gas impermeability, chemical resistance, especially towards fatty materials, stability to high temperature and to low temperature, weldability, transparency and mechanical strength. If the adhesion between plastics of different families is poor, it is known to use an intermediate layer consisting of a material capable of adhering to each of them, such as, for example, a terpolymer of ethylene, acrylic or methacrylic acid and sodium acrylate or methacrylate.

The composite films of the prior art, however, have not proven to be entirely satisfactory and the packaging industry is constantly looking for improvements, particularly with respect to the mechanical properties, weldability and adhesion of composite films.

SUMMARY OF THE INVENTION

The object of the present invention therefore is to provide, for the packaging industry, new and improved films which are not only easy and economical to produce, but possess some of the improved properties sought in composite film.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the composite films of the invention comprise:

a layer of a terpolymer film having a thickness of between 10 and 100 μm and comprising from 88 to 98.7 mol% of units derived from ethylene, from 1 to 10 mol% of units derived from an ester selected from the group consisting of alkyl acrylates and alkyl methacrylates, the alkyl group having from 1 to 6 carbon atoms, and from 0.3 to 3 mol% of units derived from maleic anhydride; and at least one other layer of a thermoplastic film, having a thickness between 25 and 3,000 μm and selected from the group consisting of low density polyethylene, polypropylene, polybutene, polyamide, polystyrene and polyvinyl chloride.

Thus the invention includes not only two-layer composite films, but also composite films of more than two layers in which the terpolymer layer can, for example, be an intermediate layer between two layers of thermoplastic films.

DESCRIPTION OF THE PREFERRED EMBODIMENTS

Reference will now be made in detail to the presently preferred embodiments of the invention.

Some of the ethylene terpolymers contemplated for use in the present invention are described in French Pat. No. 1,323,379. Special terpolymers which can also be used, and which are in particular characterized by a polydispersity index greater than 6, are described in French Patent Application No. 81/01,430, assigned to the Assignee of this application. The French patent and application are incorporated herein by reference. Such terpolymers can, where necessary, include a fourth monomer that is copolymerizable with the first three. Such a monomer can be α-olefins having from 3 to 8 carbon atoms, alkyl monomaleates and dialkyl maleates of which the alkyl groups have from 1 to 6 carbon atoms, vinyl acetate and carbon monoxide, present to the extent of up to 5 mol%. The proportion of ethylene in the tetrapolymer is then correspondingly reduced compared to the range indicated above for the fourth monomer.

The process for the manufacture of these terpolymers comprises copolymerizing, in the presence of at least one free radical initiator, a mixture composed of 94 to 99% by weight of ethylene, from 0.7 to 5% by weight of an acrylic or methacrylic ester and from 0.2 to 0.9% by weight of maleic anhydride in a reactor kept under a pressure of from 1,000 to 3,000 bars and at a temperature of from 170° to 280° C. After reaction is completed, the pressure is released and the mixture of monomers is separated from the terpolymer formed in the reactor. The mixture of ethylene and monomers previously separated off is then recycled to the reactor, the recycle stream comprising from 99 to 99.8% of ethylene and from 0.2 to 1% of acrylic or methacrylic ester.

Of the thermoplastic films suitable for use in the present invention the polypropylene and polybutene films are preferably isotactic polymers. The low density polyethylene films are understood to include ethylene homopolymers obtained in the presence of free radical initiators. Finally, among the polyamides which can be used in the present invention there are the polylactams, and the polyamides based on dicarboxylic acids and diamines, in particular on aliphatic dicarboxylic acids containing from 6 to 19 carbon atoms and on aliphatic or cycloaliphatic diamines containing from 6 to 15 carbon atoms.

The preferred thickness of the layer of thermoplastic film in the composite films of the present invention depends on the thermoplastic used. It is, for example, from 25 to 100 μm for low density polyethylene, polypropylene, polybut-1-ene and polyamide, from 25 to 2,000 μm for polyvinyl chloride and from 100 to 3,000 μm for polystyrene.

The ethylene terpolymer film used in the present invention and having a thickness between 10 and 100 μm can be obtained from a terpolymer as described above, having a melt index of between 1 and 10 dg/min and preferably contains from 0.3 to 1 mol% of units derived from maleic anhydride. This film can have a thickness of between 10 and 100 μm if it is produced by extrusion through a flat die and a thickness of between 25 and 100 μm if it is obtained by extrusion-blowing through a cylindrical die.

The process for obtaining the composite films of the invention comprises co-extruding at a speed of travel of between 2 and 200 meters per minute, the terpolymer and the thermoplastic at a temperature of between 140° C. and 160° C., and using either a cylindrical die with a blow-up ratio of between 1 and 4 or a flat die. The use of a flat die is preferred, firstly, if the layer of terpolymer is less than 25 μm thick and, secondly, if the layer of thermoplastic is more than 100 μm thick.

The composite films according to the invention have been found to have remarkably improved properties compared to known composite films using a layer of a terpolymer of ethylene, acrylic or methacrylic acid and sodium acrylate or methacrylate with a thermoplastic film layer. This improvement is particularly noticeable with regard to its tensometric properties such as the elongation at break and the tensile strength, the properties in the longitudinal and transverse direction being better balanced. It is also particularly noticeable with regard to the strength of welds at sealing temperatures of between approximately 150° and 190° C., and the peel strength, which measures the strength of adhesion between the two layers.

In view of these improved properties, the composite films according to the invention find valuable uses in the packaging of foodstuffs and other products. Other advantages of the invention will become apparent from reading the following examples, which are given for the purpose of illustrating the invention without any intention to be limited thereby.

EXAMPLE 1

Manufacture of an ethylene/ethyl acrylate/maleic anhydride terpolymer

A cylindrical autoclave reactor is used, which had three zones, each of 1 liter volume, and was equipped with a paddle stirrer. The zones were separated by valve plates. Fresh ethylene, compressed by means of a first compressor, was fed into the first zone. The second zone was fed with a homogeneous mixture of 98.9% by weight of ethylene, 0.25% by weight of maleic anhydride and 0.85% by weight of ethyl acrylate. Finally, a solution of terbutyl 2-ethyl-perhexanoate in a hydrocarbon cut was injected into the third zone. The latter thus constituted the only reaction zone, because it brought together the three comonomers and the free radical initiator.

The third zone was kept at a temperature of 230° C. and the reactor was kept under a pressure of 1,600 bars. At the bottom of the third zone of the reactor was an expansion valve which allowed the pressure to be lowered to 300 bars. After lowering the pressure the mixture of molten polymer, on the one hand, and gaseous monomers, on the other hand, after having passed through the expansion valve, entered a separating hopper. The polymer was collected at the bottom of the hopper and the gaseous monomers, after passing though a deoiling hopper, were led to a second compressor. Separately, a solution of maleic anhydride in ethyl acrylate was pumped up to pressure and fed to a homogenizer of the Venturi type, where it was mixed with the stream of recycled monomers coming from the second compressor. From the Venturi device, the mixture of the three monomers was fed to a spiral homogenizer and then recycled back to the second zone of the reactor.

The terpolymer produced was analyzed by infrared spectrophotometry. It contained 1.3 mol% of ethyl acrylate units and 0.4 mol% of maleic anhydride units. Its melt index, determined according to standard specification ASTM D 1238-73, was 3.8 dg/min. Its density, determined according to standard specification ASTM D 2839, was 0.930 g/cm$^3$.

EXAMPLE 2 (comparative) and EXAMPLE 3

In these Examples, polyamide as the thermoplastic and marketed under reference KL 1/2096 and the terpolymer were co-extruded by means of an extruder with cylindrical die, in such a way that the composite film obtained comprises a 40 μm thick layer of polyamide and a 65 μm thick layer of the terpolymer. The co-extrusion temperature was 240° C. and the blow-up ratio was kept at 1.5.

The terpolymer used in Example 2 for comparison purposes was an ionomer marketed under the name of Surlyn 1652 and contained 90% of ethylene units, 7% of sodium methacrylate units and 3% of methacrylic acid units. The terpolymer used in Example 3 was that obtained in Example 1 above.

The following tensometric properties were measured on the composite films thus obtained, which had a total thickness of 105 μm:

Tensile strength in the longitudinal direction (TSL) and in the transverse direction (TST), measured according to standard specification ASTM D 882-67 and expressed in kg/cm$^2$.

Elongation at break in the longitudinal direction (EBL) and in the transverse direction (EBT), measured according to standard specification ASTM D 882-67 and expressed as a percentage.

Peel strength in the longitudinal direction (PSL) and in the transverse direction (PST), measured according to standard specification ASTM D 903-49, modified in respect of the width of the strip of polymer (35 mm in place of 25 mm), and expressed in kilograms.

The composite films were also subjected to measurement, according to standard specification NF-K 03-004, of the weld strength (WS) expressed in kilograms, the welds being made at various sealing temperatures:

first, the strength of welds produced at a sealing temperature of 150° C. was tested within a constant time (1.5 seconds) and under a stress of 3.5 bars, and secondly, the strength of welds produced at a sealing temperature of 180° C. was tested under a constant stress (2 bars) after a time of 3 seconds.

The results of these different measurements are shown in the table below.

EXAMPLE 4 (comparative) and EXAMPLE 5

A commercial polyamide, KL1/2096, and a terpolymer were coextruded under the same working conditions as in the preceding Examples, in such a way that the composite film obtained comprised a 50 μm thick layer of the polyamide and a 50 μm thick layer of the terpolymer. The terpolymer used in Example 4 was the Surlyn 1652 ionomer used in Example 2 while the terpolymer used in Example 5 was that obtained in Example 1 above. The following were measured on the composite films which each had a total thickness of 100 μm.

First, the peel strength was measured according to standard specification ASTM D 903-49, modified in respect of the width of the strip of polymer (35 mm in place of 25 mm), the strength being expressed in kilograms, and secondly, the strength of welds produced at a sealing temperature of 160° C. was measured.

The results of these measurements are also set forth in the table below.

TABLE

| Example | TSL | TST | EBL | EBT | PSL | PST | WS 150° | WS 180° |
|---|---|---|---|---|---|---|---|---|
| 2 | 215 | 258 | 295 | 370 | 1.4 | 1.1 | 5.1 | 5.1 |
| 3 | 229 | 237 | 402 | 423 | 2.1 | 2.2 | 5.4 | 5.3 |
| 4 | — | — | — | — | 0.25 | | 1.0 | |
| 5 | — | — | — | — | 1.4 | | 1.0 | |

It will be apparent to those skilled in the art that various modificatins and variations can be made to the composite films and their process of preparation without departing from the scope or spirit of the invention.

What is claimed is:

1. A composite film consisting essentially of at least one layer of a thermoplastic film having a thickness of from 25 to 3,000 μm and selected from the group consisting of low density polyethylene, polypropylene, polybutene, polyamide, polystyrene and polyvinyl chloride and a layer of a terpolymer film comprising from 88 to 98.7 mol% of units derived from ethylene, from 1 to 10 mol% of units derived from an ester selected from the group consisting of alkyl acrylates and alkyl methacrylates, the alkyl group having from 1 to 6 carbon atoms, and from 0.3 to 3 mol% of units derived from maleic anhydride.

2. A composite film according to claim 1 in which the terpolymer additionally contains up to 5 mol% of a fourth monomer selected from the group consisting of α-olefins having from 3 to 8 carbon atoms, alkyl monomaleates and dialkyl maleates, whose alkyl groups have from 1 to 6 carbon atoms, vinyl acetate and carbon monoxide.

3. A composite film according to claim 1 in which the polydispersity index of the terpolymer is greater than 6.

4. A composite film according to claim 1, in which the terpolymer has a melt index of between 1 and 10 dg/min.

5. A composite film according to one of claims 1 or 4 in which the terpolymer contains from 0.3 to 1 mol% of units derived from maleic anhydride.

6. A process for obtaining the composite film of claim 1, comprising coextruding at a speed of travel of between 2 and 2,000 meters per minute, a film of the terpolymer and a film of the thermoplastic at a temperature of between 140° and 260° C.

7. The process of claim 6 wherein the films are coextruded through a cylindrical die with a blow-up ratio of between 1 and 4.

8. The process of claim 6, wherein the films are coextruded through a flat die.

* * * * *